United States Patent
Karame et al.

(10) Patent No.: US 11,616,804 B2
(45) Date of Patent: Mar. 28, 2023

(54) THWARTING MODEL POISONING IN FEDERATED LEARNING

(71) Applicant: NEC Laboratories Europe GmbH, Heidelberg (DE)

(72) Inventors: Ghassan Karame, Heidelberg (DE); Giorgia Azzurra Marson, Heidelberg (DE); Helen Moellering, Neuenkirchen (DE)

(73) Assignee: NEC CORPORATION, Tokyo (JP)

( * ) Notice: Subject to any disclaimer, the term of this patent is extended or adjusted under 35 U.S.C. 154(b) by 545 days.

(21) Appl. No.: 16/660,827

(22) Filed: Oct. 23, 2019

(65) Prior Publication Data

US 2021/0051169 A1 Feb. 18, 2021

Related U.S. Application Data

(60) Provisional application No. 62/886,991, filed on Aug. 15, 2019.

(51) Int. Cl.
*H04L 9/40* (2022.01)
*G06N 5/04* (2006.01)
*G06N 20/00* (2019.01)

(52) U.S. Cl.
CPC .......... *H04L 63/1441* (2013.01); *G06N 5/04* (2013.01); *G06N 20/00* (2019.01)

(58) Field of Classification Search
CPC ....... H04L 63/1441; G06N 5/04; G06N 20/00
See application file for complete search history.

(56) References Cited

U.S. PATENT DOCUMENTS

| | | | |
|---|---|---|---|
| 10,339,470 B1 | 7/2019 | Dutta et al. | |
| 11,227,050 B1* | 1/2022 | Gates | G06F 21/554 |
| 2018/0247194 A1 | 8/2018 | Plebani et al. | |
| 2019/0042937 A1 | 2/2019 | Sheller et al. | |
| 2019/0220605 A1 | 7/2019 | Kounavis et al. | |

OTHER PUBLICATIONS

Fung, Clement, Chris J. M. Yoon and Ivan Beschastnikh. "Mitigating Sybils in Federated Learning Poisoning." May 16, 2019, 16 Pages.*

Shiqi Shen, Shruti Tople, and Prateek Saxena. 2016. Auror: defending against poisoning attacks in collaborative deep learning systems. In Proceedings of the 32nd Annual Conference on Computer Security Applications (ACSAC '16). Association for Computing Machinery, New York, NY, USA, 508-519.*

(Continued)

*Primary Examiner* — Matthew T Henning
(74) *Attorney, Agent, or Firm* — Leydig, Voit & Mayer, Ltd.

(57) ABSTRACT

A method detects model-poisoning attempts in a federated learning system. The federated learning system includes a server orchestrating with clients to train a machine-learning model. The method includes receiving, by the server, results of a poisoning detection analysis. The poisoning detection analysis includes at least one of an analysis of class-specific misclassification rates or an analysis of activation clustering of a current state of the machine-learning model.

18 Claims, 8 Drawing Sheets

(56) References Cited

OTHER PUBLICATIONS

McMahan, Brendan et al. "Communication-Efficient Learning of Deep Networks from Decentralized Data," Feb. 28, 2017, arXiv:1602.05629v3.
Bonawitz, Keith et al. "Practical Secure Aggregation for Privacy-Preserving Machine Learning," pp. 1175-1191, ACM 2017, Oct. 2017.
Bagdasaryan, Eugene et al. "How to Backdoor Federated Learning," CoRR, arXiv:1807.00459v3, Aug. 6, 2019.
Liu, Yingqi et al. "Trojaning Attack on Neural Networks," NDSS Symposium 2018, Feb. 18-21, 2018.
Chen, Bryant et al. "Detecting Backdoor Attacks on Deep Neural Networks by Activation Clustering," arXiv:1811.03728v1, Nov. 9, 2018.
Han, Yufei et al. "Robust Federated Training via Collaborative Machine Teaching using Trusted Instances," arXiv:1905.02941v1, May 8, 2019.
Tan, Te Juin Lester et al. "Bypassing Backdoor Detection Algorithms in Deep Learning," arXiv:1905.13409v1, May 31, 2019.
Preuveneers, Davy et al. "Chained Anomaly Detection Models for Federated Learning: An Intrusion Detection Case Study," Appl. Sci. 2018, 8, 2663, Dec. 18, 2018.
Sattler, Felix et al. "Robust and Communication-Efficient Federated Learning from Non-IID Data," arXiv:1903.02891v1, Mar. 7, 2019.
Parulekar, Mihir, "Federated Learning: Distributed Machine Learning," Medium.com, Apr. 3, 2019.
Nishio, Takayuki et al. "Client Selection for Federated Learning with Heterogeneous Resources in Mobile Edge," arXiv:1804.008333v2, Oct. 30, 2018.
Fung, Clement et al. "Dancing in the Dark: Private Multi-Party Machine Learning in an Untrusted Setting," arXiv:1811.09712v2, Feb. 24, 2019.
Nasr, Milad et al. "Comprehensive Privacy Analysis of Deep Learning," Dec. 2018.
Gu, Zhongshu et al. "Reaching Data Confidentiality and Model Accountability on the CalTrain," arXiv:1812.03230v1, Dec. 7, 2018.
Dai, Jiazhu et al. "A backdoor attack against LSTM-based text classification systems," May 2019.
Huang, Li et al. "Patient Clustering Improves Efficiency of Federated Machine Learning to predict mortality and hospital stay time using distributed Electronic Medical Records," Mar. 2019.

\* cited by examiner

THWARTING MODEL POISONING IN FEDERATED LEARNING

CROSS-REFERENCE TO RELATED APPLICATION

Priority is claimed to U.S. Provisional Patent Application No. 62/886,991, filed on Aug. 15, 2019, the entire disclosure of which is hereby incorporated by reference herein.

FIELD

The present invention relates to a method and system for thwarting model poisoning in federated learning.

BACKGROUND

Data analytics can aid companies across many industries with accelerating their business, for example by improving customer services and products, enabling the building of intelligent transport systems, and is even gaining increasing attention in the health sector. The rise of data analytics is driven (at least in part) on the availability of improved data analysis technologies, such as neural networks and other machine learning techniques. Also contributing to this recent rise is the increasing access to a vast amount of data, which was not previously available. In fact, to build reliable neural network models, a significant amount of data is an indispensable resource. May emerging technologies—such as social networks and Internet of Things (IoT) devices—also contribute to data analytics by allowing for the collection of enormous volumes of data in real-time and at a massive scale. This so called "Big Data" is the basis of today's data science.

"Big Data" uses machine-learning algorithms to detect valuable patterns in the data, which allows operators to gain new information from the data. The use of machine-learning algorithms requires data to build, train, and evaluate the machine-learning models; however, the use of such data comes with serious security and privacy concerns. For example, valuable data often includes sensitive information that needs to be protected. This necessity not only originates from legal reasons (e.g., due to privacy-friendly legislation such as the GDPR, which has been recently put in place and introduces severe financial penalties for companies that fail to protect the data that they are processing) but also from the personal interests of the data owners themselves and the danger of discrimination.

The alarming risk of manipulation and misuse of private data has led to a huge research effort to design secure and privacy-preserving machine-learning algorithms. A remarkable outcome of such effort is a new approach called federated learning, which aims to solve the data-privacy problem. See McMahan, et al., "Communication-efficient learning of deep networks from decentralized data," AIST-ATS, 54 Proceedings of Machine Learning Research, pp. 1273-1282 (PMLR 2017) (the entire contents of which is hereby incorporated by references herein). In federated learning, all data remains local at the client, and the client will only send the model updates to a central aggregator after operating local training. The central aggregator then averages the updates of several clients to create a new, improved global model.

Since individual local updates might leak information about a client's data, dedicated aggregation mechanisms can allow clients to combine their updates in a privacy-preserving manner prior to giving them to the central aggregator. See Bonawitz, et al., "Practical secure aggregation for privacy-preserving machine learning," ACM Conference on Computer and Communications Security, pp. 1175-1191 (ACM 2017) (the entire contents of which are hereby incorporated by reference herein). This approach seems to solve the privacy problem in machine learning as the central aggregator has no access to individual data.

Nevertheless, other issues arise from this scenario. For example, federated learning is prone to so-called model poisoning where malicious clients send carefully crafted updates that cause the model to misclassify attacker-chosen samples (in a targeted or non-targeted way) while performing normally on all other samples (so that the poisoning is not visible). See Bagdasaryan, et al., "How to backdoor federated learning," CoRR, abs/1807.00459 (2018) (the entire contents of which is hereby incorporated by reference herein) ("Bagdasaryan"). So far, there is no technique that defends against (or even reduces the effectiveness of) these attacks when applying secure aggregation.

SUMMARY

An embodiment of the present invention provides a method that detects model-poisoning attempts in a federated learning system. The federated learning system includes a server orchestrating with clients to train a machine-learning model. The method includes receiving, by the server, results of a poisoning detection analysis. The poisoning detection analysis includes at least one of an analysis of class-specific misclassification rates or an analysis of activation clustering of a current state of the machine-learning model.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide an improved federated learning system with secure aggregation by employing techniques to detect malicious contributions in order to defend against model poisoning. The techniques used by embodiments are based on novel statistical methods, neural network activation clustering, and client-driven feedback. The techniques of embodiments can be flexibly operated in solo or in concert, leading to a multi-layered defense.

Embodiments of the present invention therefore improve security and enhance privacy in critical application scenarios. Example critical application scenarios include AI-based surveillance systems and healthcare. For instance, AI-based face recognition surveillance systems can greatly benefit from distributed training and can enable cross-countries sharing of confidential data while preserving the confidentiality of sensitive data. Similarly, a model trained on medical data collected in several hospitals can learn from much more diverse data; however, it is essential that patient's data is not leaked and that confidentiality is maintained across different facilities. Federated learning, when operated with secure aggregation, can meet these goals. The present invention further enhances Federated Learning by making it robust against malicious participants.

Embodiments of the present invention can implement a statistical technique to defend against model poisoning in federated learning (i.e., a statistical method defensive layer D1). In an embodiment, the statistical method technique includes an analysis of class-specific misclassification rates. An implementation using the technique for an analysis of class-specific misclassification rates includes the following operation: analyze the distribution of class-specific misclassification rates to detect backdoored behavior using appropriate metrics.

Embodiments of the present invention can implement a neural network activation clustering technique to defend against model poisoning in federated learning (i.e., a neural network defensive layer D2). The activation clustering technique includes the operation of applying activation-clustering defenses to the federated learning setting. The activation-clustering defenses are configured to detect poisoned models by inspecting neural network activations.

Embodiments of the present invention can implement a client-driven feedback technique to defend against model poisoning in federated learning (i.e., a client-driven feedback defensive layer D3). In an embodiment, the client-driven feedback technique uses a feedback loop. The feedback loop technique increases the chance of detecting poisoning attempts by letting the clients support the server in detecting poisoning attempts, and thus, apply detection techniques locally.

According to an embodiment, a method is provided for detecting poisoning attempts in a federated learning setting, the method includes implementing at least one of three defensive layers: an analysis of class-specific misclassification rates (D1); activation clustering (D2); and a feedback loop (D3). In an embodiment, the method includes the following:

1) For each round r=1, . . . , R of Federated Training, server S selects among the clients a subset of contributors $\{C_1, \ldots, C_n\}$ and sends them the current global model $G:=G^r$ 2) In round r, for $E \in \{S\}$, (D3) for every $E \in \{C_1, \ldots, C_n\}$, or for every $E \in \{S, C_1, \ldots, C_n\}$, entity E proceeds by:
   a. In round r, for $E \in \{S\}$ or (D3) for every $E \in \{S, C_1, \ldots, C_n\}$, entity E proceeds by:
      D1. Analyzing the class-specific misclassification rate of G w.r.t. E's test data
      D2. Performing activation clustering for G w.r.t. E's test data
   b. If test 2) approves the model, the clients proceed with the federated training and secure aggregation; this step ends with an updated model $G^r:=G'$ Each of the three defensive layer techniques (D1-D3) detect and/or block poisoning attempts in federated learning systems. The defensive layers can be flexibly operated solo or in concert. For example, the defensive layer techniques D1 and D2 can both be applied by any entity who obtains the current global model and has some validation/test data (e.g., this entity can be the server, any of the clients, or a combination thereof). Defense technique D3 enriches the server's decision by leveraging the testing capabilities of the clients. According to the defensive technique D3, the clients could, in principle use, any detection method to identify poisoning attempts. In an embodiments, when employing defensive technique D3, the clients use defensive techniques D1 and/or D2 (such combination leads to a 3-layer defense).

An embodiment of the present invention provides a method that detects model-poisoning attempts in a federated learning system. The federated learning system includes a server orchestrating with clients to train a machine-learning model. The method includes receiving, by the server, results of a poisoning detection analysis. The poisoning detection analysis includes at least one of an analysis of class-specific misclassification rates or an analysis of activation clustering of a current state of the machine-learning model.

The server may select a subset of clients (from the clients) to perform the poisoning detection analysis on the current state of the machine learning model. The server may send to the subset of clients at least the current state of the machine learning model. The server may receive from at least one client (of the subset of clients) the results of the poisoning detection analysis.

The server can determine from the results of the poisoning detection analysis a number of the subset of clients that have accepted the current state of the machine learning model. The server can determine to update the current state of the model to a new state based upon the number of the subset of clients that have accepted the current state of the machine leaning model to meeting a threshold.

The server may select a new subset of clients from the clients to perform the poisoning detection analysis on the new state of the machine learning model. The server may send to the new subset of clients at least the new state of the machine learning model. The server may receive from at least one client (of the new subset of clients) the results of the poisoning detection analysis.

The server may send a specification of the poisoning detection analysis to the subset of clients. The specification can include instructions on whether to perform one or both of the analysis of class-specific misclassification rates or the analysis of activation clustering.

Performing the analysis of class-specific misclassification rates can include: applying test data to the current state of the machine learning model to obtain predictions; comparing the predictions to expected labels to obtain a misclassification distribution; applying at least one metric to determine one or more aggregation of distances; and flagging the current state of the model as poisoned based upon the one or more distances exceeding a threshold.

The at least one metric may include distances among class-specific error rates for the current state of the machine learning model as compared to a previous state of the machine learning model or pairwise differences in error rates among classes for the current state of the machine learning model.

The aggregation performed may correspond to at least one of sum, absolute, Euclidian, or squared Euclidean norms.

Performing the analysis of activation clustering can include: applying test data as an input to the current state of the machine learning model to determine activations of the machine learning model; extracting the activations from the machine learning model; sorting the activations according to predicted classes into groups; performing a dimension reduction on each group of the sorted activations; clustering the reduced activations into clusters; and applying at least one metric to the clusters to determine whether at least one threshold is exceeded; and flagging the current state of the model as poisoned based upon exceeding the at least one threshold.

The at least one metric can include at least one of a threshold size of the clusters, a threshold centroid distance of the clusters, or a threshold class-wise average silhouette of the clusters.

The method may further include the server applying test data as an input to the current state of the machine learning model in order to determine predictions for use in the analysis of class-specific misclassification rates or to extract activations for use in the analysis of activation clustering.

Another embodiment of the present invention provides a system having one or more processors coupled to a non-transitory storage medium or media containing instructions, which when executed by the one or more processors, alone or in combination, cause the system to perform a method. The method performed includes: receiving results of a poisoning detection analysis. The poisoning detection analysis including at least one of an analysis of class-specific misclassification rates or an analysis of activation clustering of a current state of the machine learning model.

The method performed by the system may further include: selecting a subset of clients to perform the poisoning detection analysis on the current state of the machine learning model; sending to the subset of clients at least the current state of the machine learning model; and receiving, from at least one client of the subset of clients, the results of the poisoning detection analysis.

Another embodiment of the present invention provides a tangible, non-transitory computer-readable medium having instructions thereon which, upon being executed by one or more processors, alone or in combination, provide for execution of a method. The executed method includes receiving results of a poisoning detection analysis. The poisoning detection analysis having at least one of an analysis of class-specific misclassification rates or an analysis of activation clustering of a current state of the machine learning model.

The method executed according to the instructions may further include: selecting a subset of clients to perform the poisoning detection analysis on the current state of the machine learning model; sending to the subset of clients at least the current state of the machine learning model; and receiving, from at least one client of the subset of clients, the results of the poisoning detection analysis.

Embodiments of the present invention therefore provide an improved federated learning system that has enhanced security and privacy preservation attributes due to implementing a novel technique that enables detecting and defending against semantic backdoor attacks on federated learning with neural networks. Additionally, embodiments also enable a high level of privacy-protection for clients' data through allowing the use of secure aggregation.

Figure 1:
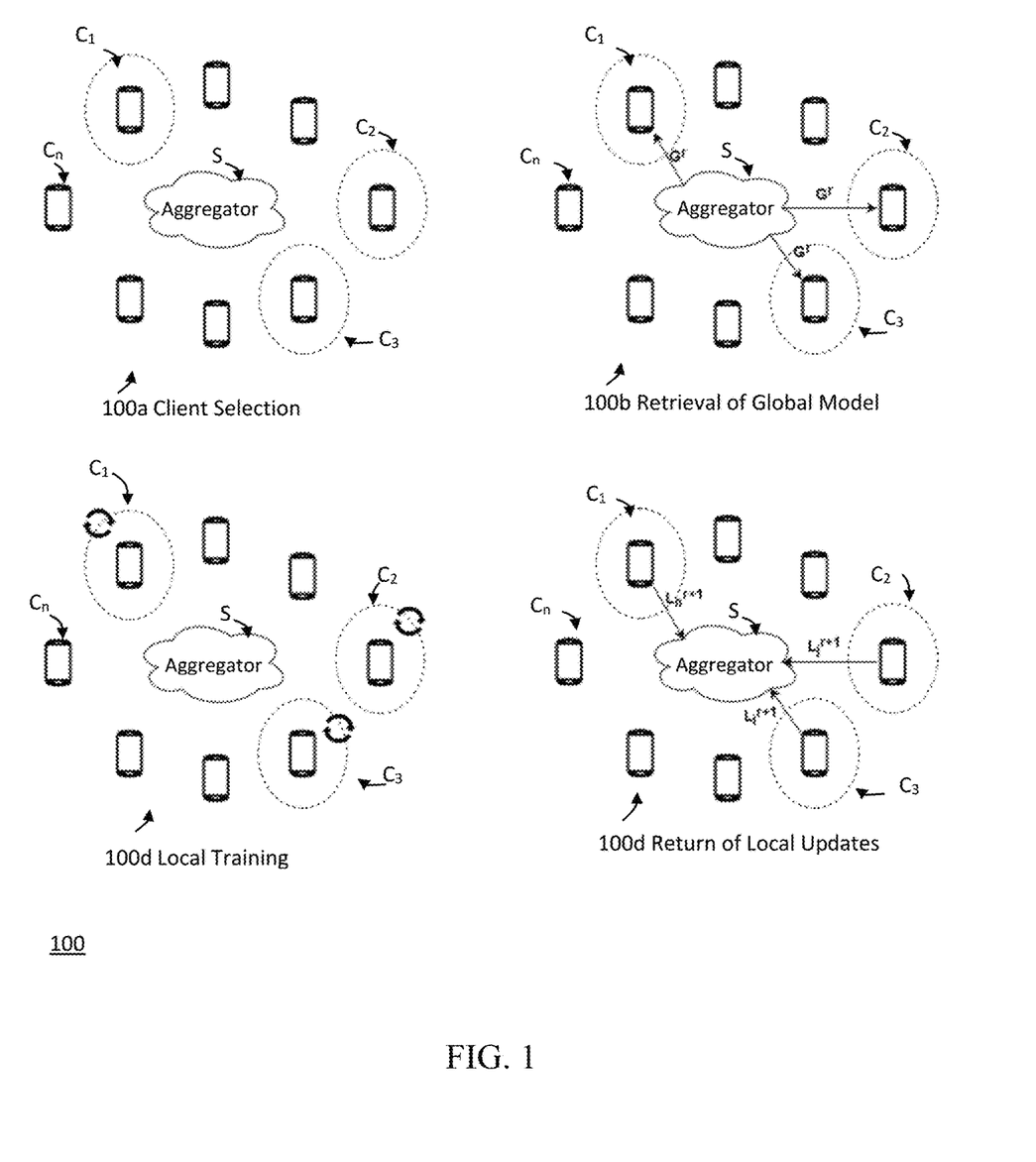
FIG. 1 illustrates an embodiment of a federated learning process.

FIG. 1 illustrates a federated learning process 100.

Federated Learning (FL) provides a decentralized method to train a model in a distributed fashion, leveraging data and resources of several users. In this regard, federated learning is in contrast to standard training approaches that require storing all training data on a single machine or datacenter.

Federated learning is an iterative process, orchestrated by a central server S (or aggregator), enabling clients C to collaboratively train a shared model G. R is the number of rounds comprising the overall training process. At round $r \in [1 \ldots R]$ the server S holds the current global model $G := G^{r-1}$ ($G^0$ being a server-initialized model). The number of rounds R may be preset or may be based on a threshold criteria. The global model G is the machine learning model as managed by the central server S. The global model G may be a neural network model.

As part of the federated learning process 100, the central server S selects clients C to perform the federated learning, or at least a round r of the federated learning (100a). The clients C may be a set (e.g., fixed set) of clients, i.e., $C = \{C_1, \ldots C_n\}$, that are expected to contribute to federated training with their own data set $D_i$, for $i \in [1 \ldots N]$. The client selection process is not limited to a particular criteria. For example, in an embodiment, the clients C are selected at random, e.g., the server S randomly selects $n \ll N$ clients $C_{i_1^r}, \ldots, C_{i_n^r}$ for that round. In other embodiments, however, the clients may be selected (at least in part) on the basis of each having a portion of a set of relevant data or other available resources.

As shown in FIG. 1, three clients ($C_1$, $C_2$, and $C_3$) are selected by the server S. Here, the clients ($C_1$, $C_2$, and $C_3$) were selected at random. The central server S then sends to the selected clients ($C_1$, $C_2$, and $C_3$) the current global model $G^{r-1}$ (100b).

After receiving the current global model $G^r$ and instantiating the current global model $G^r$ as their local model ($L_1^r$, $L_2^r$, $L_3^r$), the selected clients ($C_1$, $C_2$, and $C_3$) perform model-training locally (100c). For example, the selected clients ($C_1$, $C_2$, and $C_3$) perform model-training on their locally stored test data. By performing the model-training locally, each of the local clients' data never has to leave their device. This provides a measure of data protection and privacy preservation. Continuing the description, let $I^r := \{i_1^r, \ldots i_n^r\}$. Each client $C_i$, $i \in I^r$, proceeds with training a local model using G as original model and $D_i$ as training data, therefore deriving a model update $U_i$ (an updated gradient).

Once the selected clients ($C_1$, $C_2$, and $C_3$) train their respective local model ($L_1^r$, $L_2^r$, $L_3^r$) to create their updated local model ($L_1^{r+1}$, $L_2^{r+1}$, $L_3^{r+1}$), the selected clients ($C_1$, $C_2$, and $C_3$) send their respective (updated) local model ($L_1^{r+1}$, $L_2^{r+1}$, $L_3^{r+1}$) and/or their updates $\{U_i\}_{i \in I^r}$ (e.g., gradient updates) to the server S. The server S then aggregates the locally-computed updates to derive an updated version of the shared model G' (100d). The server S may combine the updated local models and/or the updates by executing an interactive aggregation protocol to obtain the new global model G'. The aggregation protocol can be optionally executed in a privacy-preserving manner to ensure that no information about the clients' training data is leaked to the server or to the other clients. Upon completion of round r, the current global model is set to $G^r := G'$.

The server S and the selected clients ($C_1$, $C_2$, and $C_3$)—or a different selection of clients (e.g., from the set of clients $C = \{C_{i_1}^r, \ldots, C_{i_n}^r\}$ who contribute the training changes in every round)—can then iteratively repeat the federated learning process 100 by retrieving the updated global model for the new round (100b), locally training the updated model (100c), and returning and aggregating the further updated model (100d).

Due to the lack of accountability in current deployments of federated learning, it is relatively easy for an attacker who controls one or more clients to tamper with the training process. This possibility has been recently highlighted by a number of model-poisoning attacks. A prominent attack that aims at backdooring the model is discussed in Bagdasaryan. Bagdasaryan presents a semantic backdoor attack that can introduce a backdoor into the global model by any malicious client who is selected by the server in just one round. Bagdasaryan's attack amplifies a malicious update to cause the model replacement by scaling it such that it has more effect on the global model than honestly created updates. Additionally, Bagdasaryan proposes an objective function that includes the normal loss function but also accounts for anomaly detection for malicious clients, and suggests clipping weights to a maximum bound to evade detection. Nevertheless, because a client cannot control the random selection process, the success of the attack is dependent on having a malicious client be chosen late in the training process.

Some defense strategies have been proposed that aim to defend against attacks on the training phase, but these are either not designed for federated learning or are not applicable to neural networks. For example, a number of defenses against Trojan attacks have been proposed (in contrast to semantic backdoors that embodiments of the present invention defend against). See, e.g., Liu et al., "Trojaning Attack on Neural Networks," NDSS Symposium 2018 (the entire contents of which are hereby incorporated by reference herein). Trojaned backdoors add a specific artificial trigger (for example, a pixel pattern) to the original data that will cause the misclassification, while semantic backdoors cause misclassifications based on naturally occurring features.

One defensive strategy, proposed by Chen, uses activation clustering to detect classes poisoned with Trojaned backdoors. Chen et al., "Detecting backdoor attacks on deep neural networks by activation clustering," SafeAI@AAAI, 2301 CEUR Workshop Proceedings (2019) (the entire contents of which are hereby incorporated by reference herein) ("Chen"). This defensive strategy is not designed for a federated learning scenario, but instead considers settings where data is collected from untrusted sources and stored locally for training. After training with the potentially manipulated data, the activation of the last layer for each class when querying the training data is clustered with 2-means. Chen suggests that a poisoned class will result into two classes while unpoisoned classes can be well represented with one cluster. Additionally, Chen suggests the summary/average of a class as verification for poisoning because it will show poisoned elements. If poisoning is detected, Chen proposes to recover by training with the relabeled previously poisoned data until convergence.

While model-poisoning attacks discussed herein are primarily in the context of federated learning, for the sake of clarity the concept of a "backdoored classifier" can be defined in general terms, regardless of whether the training process is centralized, distributed, or federated. More concretely, the adversarial objective against a classifier f can be defined in terms of malicious behavior that f should exhibit in order to be declared "successfully poisoned/backdoored", independently of how the attacker operates. This concept can be then extended to the federated learning scenario, for example, by specifying realistic adversarial capabilities and adapting the adversarial objective accordingly.

The following notation is helpful for clarity of understanding.

For a, b∈ℕ, [a . . . b]:={x∈ℕ:a≤x≤b} is used herein. Here, X is a (finite) set, and $\mathcal{D}$: X→[0,1] is a probability distribution. The random sampling of an element x according to distribution $\mathcal{D}$ is denoted by $x \leftarrow_\mathcal{D} X$. For the special case of sampling x uniformly at random, $x \leftarrow_s X$ is used. If R(x) is a random variable based on the random choice $x \leftarrow_\mathcal{D} X$, its expected value is denoted by $\mathbb{E}_\mathcal{D}[R(x)]$.

The ground-truth function of the classification problem of interest is denoted by $\mathcal{F}$:X→Y, where X and Y are the sets of instances and corresponding labels respectively. The training process includes deriving a machine-learning model f for classification, a.k.a. classifier, emulating $\mathcal{F}$ from a set $D^{train}$ of labeled instances, so-called training set $D^{train}=\{(x,y):x\in X^{train}, y=\mathcal{F}(x)\}$, where $X^{train}\subseteq X$. A standard metric to evaluate whether the classifier f has been appropriately trained is the classifier's accuracy. Let X⊆X, and let D be the corresponding labeled set, $D=\{(x,y): x\in X, y=\mathcal{F}(x)\}$. The classification accuracy of f w.r.t. set D is referred to as the number of correctly classified instances in D. Formally:

$$acc_D(f) := \frac{|\{(x, y) \in D: f(x) = y\}|}{|D|}. \quad (1)$$

The error of classifier f is defined analogously, and we have $err_D(f)=1-acc_D(f)$. For a set X⊆X, the shortcut $X_\checkmark(f)=\{x\in X: f(x)=\mathcal{F}(x)\}$ is used to denote the set of samples in X that are correctly classified by f. Similarly, $X_\times(f)=\{x\in X: f(x)\neq \mathcal{F}(x)\}$ denotes the set of misclassified instances. If D is the labeled set associated to X, $D_\checkmark(f)$ and $D_\times(f)$ may also be written for the above sets. Using this notation, we have $acc_D(f)=|D_\checkmark(f)|/|D|$ and $err_D(f)=|D_\times(f)|/|D|$. Whenever the classifier f is clear from the context, we may abuse the notation and omit f from the notation introduced above.

For the set of instances X⊆X and a label y∈Y, the set of samples in X that belong to class y are denoted by $X_y:=\{x\in X: \mathcal{F}(x)=y\}$, and those samples are referred to as the y-instances in X Given a classifier f, for any two (possibly coinciding) labels y,y'∈Y the set of y-instances in X that f predicts as y' are denoted by $X_{y\to y'}:=\{x\in X_y:f(x)=y'\}$.

Backdoored classifiers are defined along the lines of semantic backdoors as introduced by Bagdasaryan. Here, X⊆X is a set of instances, with $X^*\subset X_y$. A classifier f is (perfectly) backdoored with respect to set $X^*$ and target $y_t\neq y$ if f predicts all instances of $X^*$ as belonging to the target class $y_t$ i.e., $X_{y\to y_t}^*(f)=X^*$. Correspondingly, the backdoor accuracy of f with respect to set $X^*$ and target $y_t$ is defined as the number of samples in $X^*$ that f misclassifies as belonging to the target class:

$$acc_{X^*,y_t}^{bd}(f) := \frac{|\{x \in X^*: f(x) = y_t\}|}{|X^*|} = \frac{|X_{y\to y_t}^*|}{X^*} \quad (2)$$

A more general concept of "backdoored set" $X^*$ that is not restricted to one single class y is also within the scope of the present invention.

Figure 2:
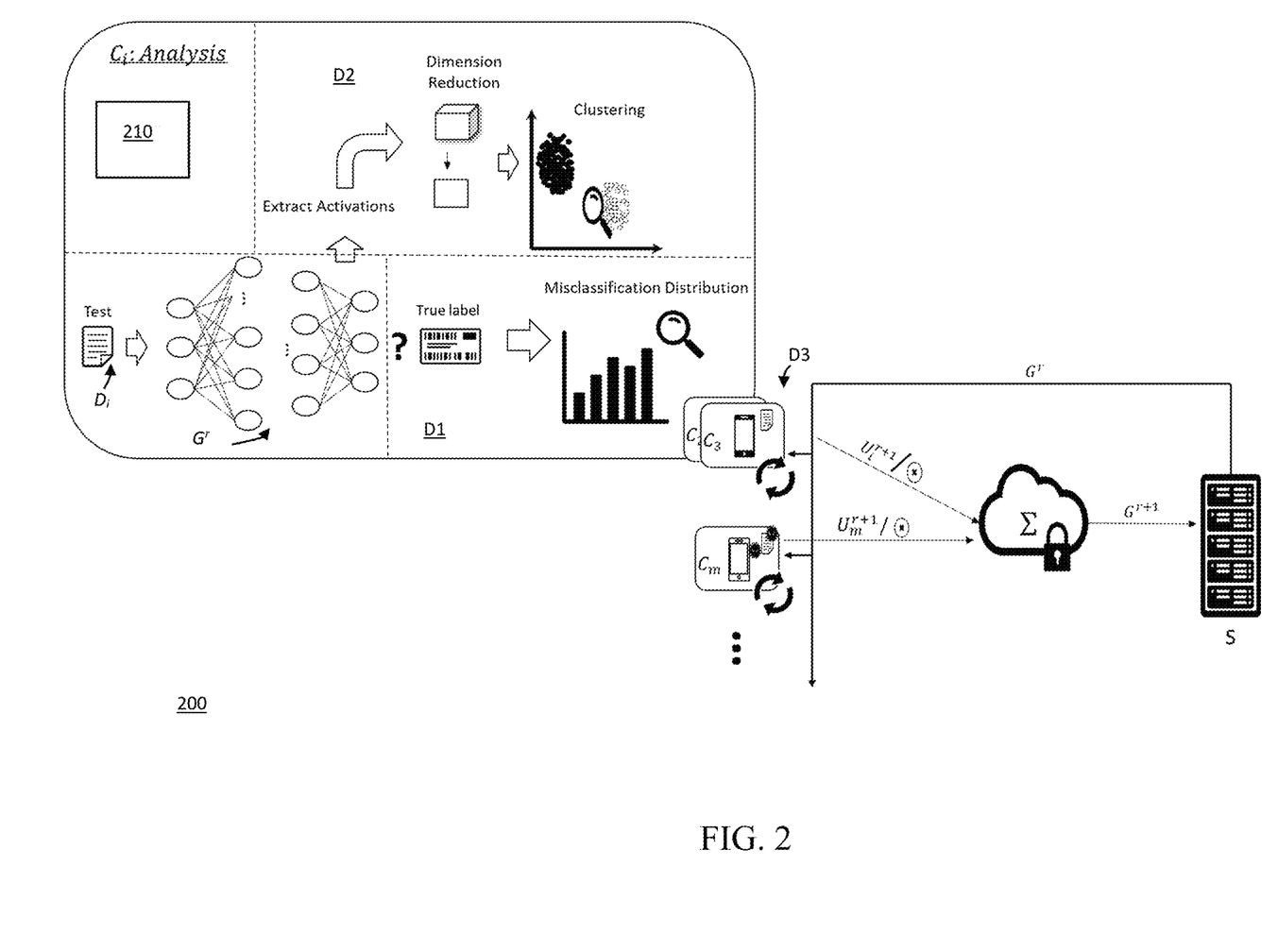
FIG. 2 illustrates a defensive scheme according to an embodiment of the present invention.

FIG. 2 illustrates a defensive scheme according to an embodiment of the present invention. The defensive scheme 200 defends against semantic backdoors in federated learning systems. In particular, the defensive scheme 200 includes a three-layer defense against model-poisoning attacks. The first defensive layer D1 uses a statistical analysis of (fine-grained) misclassification distributions observed after each round of training. The second defensive layer D2 uses activation clustering. The third defensive layer D3 leverages the diversity of clients' test data and relies on feedback that the server obtains from clients in each round regarding the updated model.

Each defensive layer (D1-D3) could be applied individually, or in combination with the other layers, depending on embodiments of the present invention. For example, if the server has validation data that can be used to test the model (e.g., using the techniques of defensive layer D1 and/or D2), the third defensive layer D3 (feedback layer) may not be used (i.e., the server does not rely on clients to inspect the model's behavior).

In FIG. 2, a central server S orchestrates the defensive scheme 200 leveraging federated clients $C_1 \ldots C_m$, which have their own test datasets $D_1, \ldots, D_m$, which can be used to train and evaluate the global model G. For the current round r, the server S sends the current global model $G^r$ to a selection (e.g., random selection of the clients C).

In the defensive scheme 200, the server S request that the selected clients C give feedback on the current model C. In this way, the defensive scheme 200, employs the third defensive layer D3, i.e., the feedback loop defensive layer.

Because the defensive scheme 200 employs the feedback loop defensive layer D3, each of the selected clients C for the present round will perform the statistical analysis of misclassification distributions D1 and/or the activation clustering D2. In an embodiment, the misclassification distribution defensive layer D1 and the activation clustering defensive layer D2 analyses are performed in parallel. However, in other embodiments, the defensive layers may be performed in series. For example, in an embodiment the activation clustering defensive layer D2 analysis may be performed first, and only if that analysis passes, does the client perform the misclassification distribution defensive layer D1. If either of the defensive layer analyses results in a determination of malicious behavior, the client C can send a notification to the server S.

Also, the same group of selected clients C may also perform the training 210 on the current model G in the present round to provide an updated gradient $U_t^{r+1}$ to the server S for aggregation to determine the global model $G^{r+1}$ for the next round r+1.

This process may repeat for the next round r+1, including a selection of a new set of clients. The number of rounds to complete may be predetermined by the system.

Further details of embodiments of the defensive layers (D1-D3) are given below.

Figure 3:
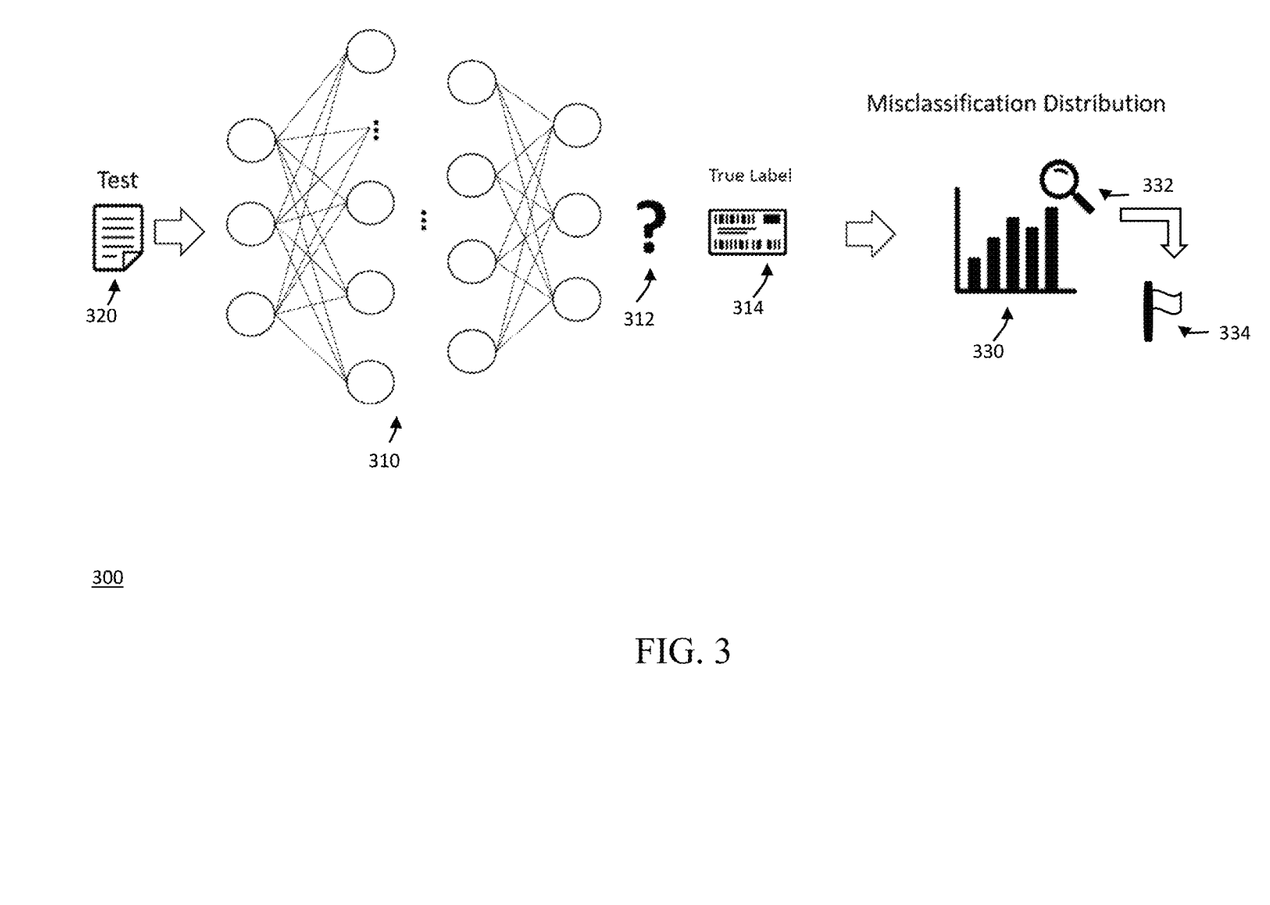
FIG. 3 illustrates an overview of a class misclassification defensive layer.

FIG. 3 illustrates an overview of an embodiment of the misclassification analysis defensive layer 300, which is also referred to as the first defensive layer D1.

The misclassification analysis defensive layer 300 relies on statistical methods to detect whether the global model has been backdoored in a given round. Briefly, the method applied by this defensive layer observes the behavior of the model 310 on test data 320 by looking closely (inspection 332) at the empirical distribution 330 of the model's predictions 312 on misclassified samples in a class-specific fashion. To determine the empirical distribution 330 of the misclassified samples, the defensive layer 300 obtains the predictions 312 from applying the test data 320 to the model 310, and compares the predictions 312 to the true labels 314.

The detection method employed by the misclassification analysis defensive layer 300 includes: (1) inspecting the empirical distribution 330 of class-specific misclassification rates (332); and (2) issuing a warning (or flagging results) when the results indicate suspicious behavior of the model (334).

In order to express the properties of "clean" and "suspicious" misclassification rates, suitable metrics are used to reflect the above-mentioned notable behaviors, allowing for the separation of clean and poisoned models. These metrics were chosen so that the misclassification rates for all classes can be summarized in one number (similarly to the overall misclassification rate) that indicates whether the per-class error rates differ significantly. Under the assumption that clean models present roughly uniform misclassification rates across classes, while poisoned models do not, the proposed metrics allow to distinguish clean models from suspicious ones.

The first metric considers the mutual differences among the misclassification rates in a given round, and aggregates them to derive an average "distance" (for various distance metrics, as is explained below). The second metric also relies on differences among misclassification rates, and in addition compares these values with the results obtained from the previous, most recent rounds.

In what follows, further notation is introduced to describe the present embodiment in a compact way.

Given a classifier f and two distinct labels $Y_s, Y_t \in Y, y_s \neq y_t$, set $D_{y_s \to y_t}(f)$ denotes the set of instances belonging to a source class $y_s$ that f erroneously predicts as belonging to a target class $y_t$. Extending this notation (and dropping the explicit dependency on the classifier), $D_{y_s \to *}$ is for the set of all misclassified $y_s$-instances in D, and similarly $D_{* \to y_t}$ denotes the set of all instances in D that are misclassified as $y_t$-instances. Correspondingly, the error rates of f in misclassifying $y_s$-instances and misclassifying samples in D as $y_t$-instances are denoted, respectively, as:

$$err_D^{y_s \to *}(f) = \frac{|\{(x, y) \in D_{y_s} : f(x) \neq y_s\}|}{|D_{y_s}|}, \text{ and} \quad (3)$$

$$err_D^{* \to y_t}(f) = \frac{|\{(x, y) \in D \setminus D_{y_t} : f(x) = y_t\}|}{|D \setminus D_{y_t}|}. \quad (4)$$

Further, when the underlying dataset D and/or model f are clear from the context, the above quantities can be denoted by $e_f^s(y_s)$ and $e^s(y_s)$, respectively (the target-centric error is shortcut analogously.)

Now, the metrics to identify poisoning attempts by inspecting the class-specific error rates just defined can be described. For clarity of exposition, explicit references to the test set D are omitted whenever clear from the context. Moreover, since the defenses are specifically designed for a federated learning scenario, in the following, a given round of federated learning is envisioned and denoted by G and G', which are the "previous" global model (i.e., prior to applying the round updates) and the "current" one respectively.

The first metric considers the pairwise misclassification rates among classes.

The first metric is based on the observation that in each given round, while a clean model G should present class-specific misclassification rates that are relatively close to each other, a backdoored model is likely to favor one class over the others, leading to a non-uniform misclassification distribution.

Given this, the model's misclassification behavior is analyzed by looking at the "distances" among class-specific error rates. Namely, pairwise differences are calculated over all pairs of distinct classes, among class-specific misclassification rates, and then the values are aggregated. This metric was chosen to allow summarizing all per-class rates and to allow for simultaneous and visible rendering of significant differences among these rates. Here, four different aggregation rules can be considered: {SUM, ABS, ED, SE}, which corresponding to "(plain) sum", "absolute", "euclidean", and "squared euclidean" norms, for the pairwise difference between (source/target) misclassifications rates for all distinct classes:

$$SUM = \sum_{y \neq y' \in Y} (e(y) - e(y')), \quad (5)$$

$$ABS = \sum_{y \neq y' \in Y} |e(y) - e(y')|, \quad (6)$$

$$ED = \sqrt{\sum_{y \neq y' \in Y} (e(y) - e(y'))^2}, \text{ and} \quad (7)$$

$$SE = \sum_{y \neq y' \in Y} (e(y) - e(y'))^2 \quad (8)$$

Not all aggregation rules need be considered in each instance. For example, in some implementations only ABS and SE aggregation rules are considered.

The second metric is misclassifications among subsequent rounds.

The second metric relies on the observation that honest updates should not significantly affect the class-specific misclassification rates of the global model across subsequent rounds. In contrast, a freshly injected backdoor is likely to boost the misclassification rate of one class. While using the same aggregation rules as above, {SUM, ABS, ED, SE}(or a subset thereof, e.g., ABS and SE), here the differences of same-class error rates for the current and the previous round are aggregated, namely:

$$SUM = \sum_{y \in Y} (e_{G'}(y) - e_G(y)), \quad (9)$$

$$ABS = \sum_{y \in Y} |e_{G'}(y) - e_G(y)|, \quad (10)$$

$$ED = \sqrt{\sum_{y \in Y} (e_{G'}(y) - e_G(y))^2}, \text{ and} \quad (11)$$

$$SE = \sum_{y \in Y} (e_{G'}(y) - e_G(y))^2 \quad (12)$$

For the pure class-specific misclassification, it is assumed that the server holds a test set which it uses to analyze a new updated model.

The threshold to distinguish between benign and malicious updates is calculated based on mean and standard derivation of the metrics from the previous x rounds. Thereby, x can be set according to the data set (e.g., the overall size, amount of samples per class, etc.). If the value for the new model lies in a range of $[\mu-z\sigma, \mu+z\sigma]$, for $z \in \mathbb{N}$, it will be accepted, otherwise the server rejects the update. The factor z can again be chosen based on the data set (typical choices are $z \in \{1, 2, 3\}$). The threshold can be derived from the metric and aggregation rule (e.g., for each combination (metric, rule) where metric in {1,2} and rule in {ABS,SE}, we have a new threshold value.

Figure 4:
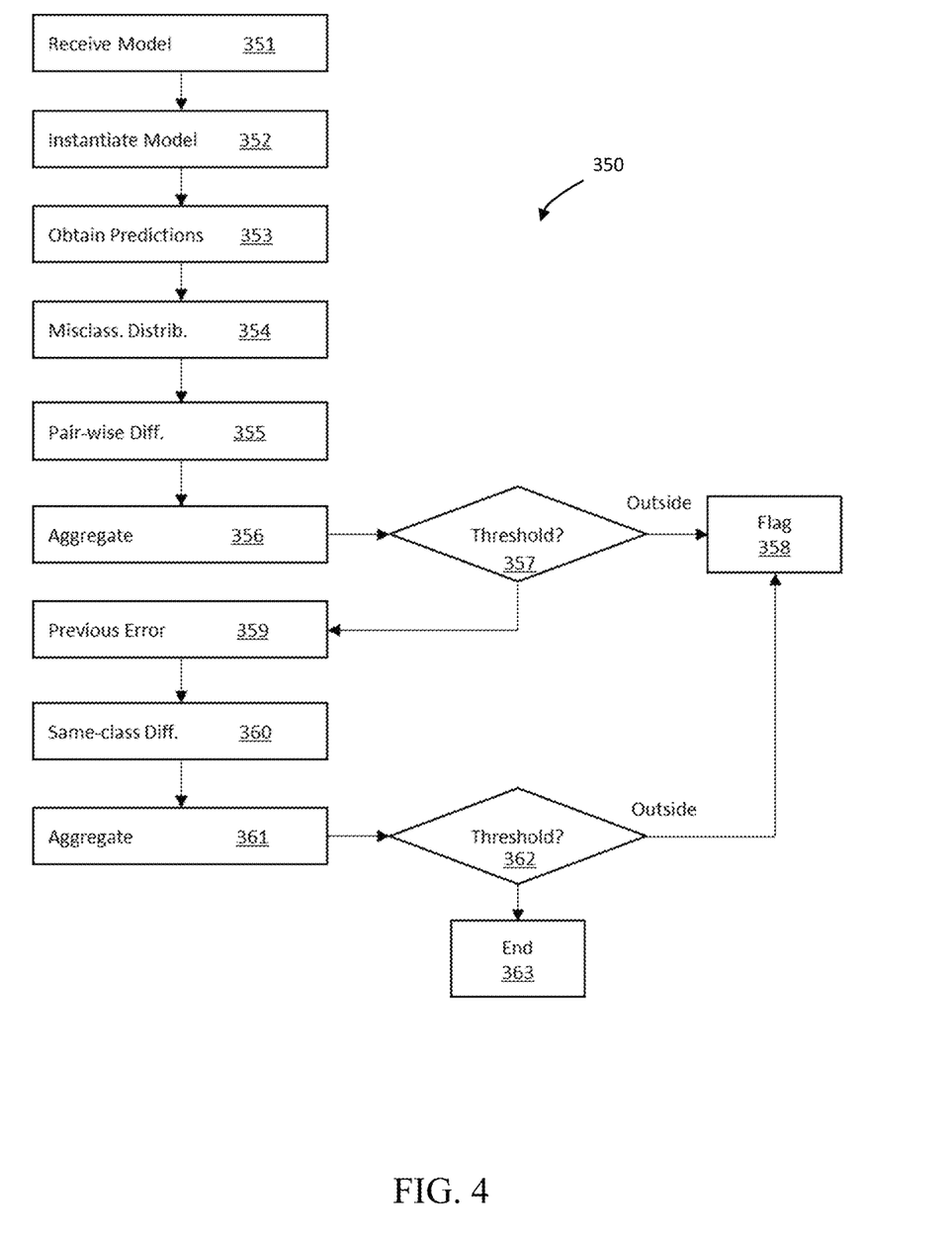
FIG. 4 illustrates a method of operating a class misclassification defensive layer.

FIG. 4 illustrates a method of performing an embodiment of the misclassification analysis for the first defensive layer. The misclassification analysis method 350 may be performed by a central server and/or by one or more clients. For example, when the feedback loop defensive layer (i.e., the third defensive layer) is implemented, a selection of clients may each perform the method 350 (e.g., in parallel on their own test data).

As shown in FIG. 4, a current model is received (351) and instantiated (352). Test data is then applied as an input to the current model to obtain classification predictions (353). The classification predictions are then compared to the true labels (expected labels) to obtain a misclassification distribution (354).

From the calculated misclassification distribution of the current model, the method 350 applies a first metric to determine whether the model is exhibiting suspicious behavior. To apply the first metric, the method first calculates pairwise differences of class-specific miscalculation rates over all pairs of distinct classes (355). Then, the values of the calculated pairwise differences are aggregated (e.g., using one or more of the above-described aggregation rules) (356). The aggregate value is then compared against a threshold to determine if the aggregate value is outside of the threshold range (357). If the aggregate value is outside of the threshold range, the current model is flagged as exhibiting suspicious behavior (358).

The method 350 may also apply a second metric to determine whether the model is exhibiting suspicious behavior. To apply the second metric, the class-specific error rates for the previous round's model either need to be received and/or determined (359). Next, the differences of the same-class error rates between the current round's model and the previous round's model are calculated (360). These calculated values of the same class differences are then aggregated (361). This aggregate value is then compared against a threshold to determine if the aggregate value is outside of the threshold range (362). If the aggregate value is outside of the threshold range, the current model is flagged as exhibiting suspicious behavior (358).

If no suspicious behavior is flagged the current model is considered to be benign (by this defensive layer) (363).

Figure 5:
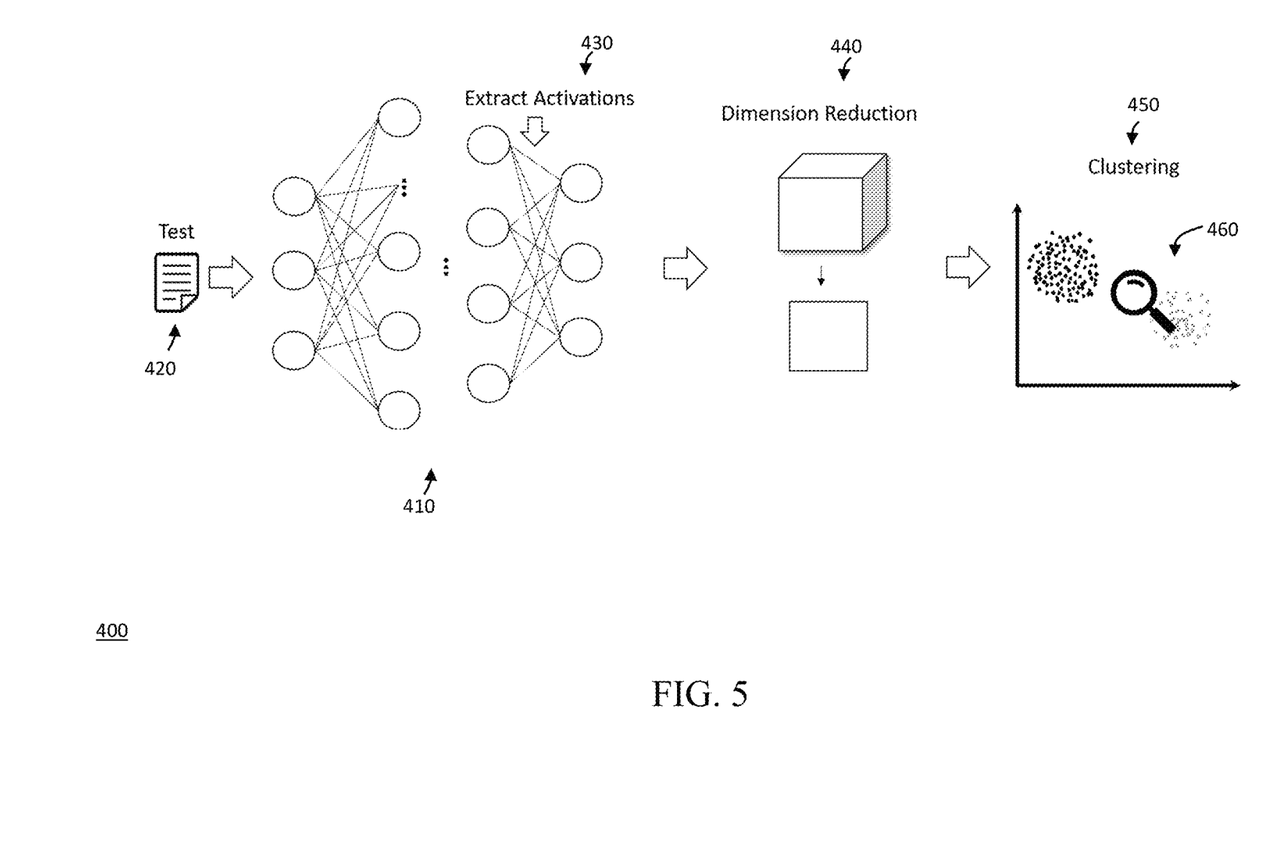
FIG. 5 illustrates an overview of an activation clustering defensive layer.

FIG. 5 illustrates an overview of an embodiment of the activation clustering defensive layer 400, which is also referred to as the second defensive layer D2.

The second defense detects backdoored models via activation clustering. Briefly, activation clustering detects a backdoored model by inspecting the neural-network activations of the last hidden layer when processing test samples. An important observation is that clean samples and backdoor samples predicted to the same class present significantly different activations. Therefore, under the assumption that the test set contains backdoor samples (i.e., $X \cap X^* \neq \emptyset$ in the notation scheme above), the activations of a backdoored model will exhibit a peculiar behavior on the target class compared to all other classes, which allows detection.

The steps after receiving a new updated model 410 include that the server (or client) applies its test set 420 to the model 410 (1st step), extracts the activations 430 after the last hidden layer (2nd step), and sorts it according to the predicted classes (e.g., activations leading to the same class are grouped together) (3rd step). Afterwards, a dimension reduction technique 440 (for example Principal Component Analysis, PCA, or Independent Component Analysis, ICA) is applied on each group of sorted activations (4th step), and the reduced activations are clustered into groups 450 (e.g. clustered with K-means into 2 groups) (5th step).

After creating the clusters, embodiments use metrics (e.g., three metrics) to assess 460 how well the clusters fit to the data. As described before, when a class is poisoned, the clustering will divide between the malicious and benign activations, such that the two clusters will fit well, whereas when there is no poisoning the clustering will split the data somewhere at random. This phenomenon will be visible in the clusters' sizes, the distances between the clusters' centroids, and the silhouette score.

For the clusters' sizes, relatively equally sized (or similarly sized) clusters will be received in the benign case because all samples are naturally classified into the same class so the data is relatively similar and no clear boundary given. The size of a cluster may be defined as the number of points it contains. A threshold value can be set as a percent difference between sizes of clusters that is used to determine when clusters are "relatively equally" (or "similarly") sized, e.g., 0% to 5%, or preferably 0% to 2%, or more preferably 0% to 1%. A person of ordinary skill in the art would be able to determine the threshold for when the clusters are "relatively equally" (or "similarly") sized (i.e., set the threshold). A person of ordinary skill in the art may set the threshold based on, for example, the number of clusters that the chosen clustering method creates. For instance, if there are two clusters, "suspicious behavior" can be having the two clusters differing in size by more than 5%.

On the other hand, for the poisoned model, the backdoored images share a specific important characteristic that maps them into the same class and that is different from the main characteristics of the natural images of the target class. Therefore, these characteristics split the two types of images into two clearly separated groups, but the group of the poisoned samples will be significantly smaller as they are just a small subset of all samples predicted to belong to this class.

The same reasoning also applies for the centroid's distances. Distance can be determined by a variety of methods. For example, where the clusters aggregate points in a d-dimensional space, the distance between centroids may be the actual distance between the points corresponding to the centroids (or some other criteria). In the benign case, the two centroids will be relatively short, because the data in the two clusters is not significantly different. In the malicious case, the clusters will be further apart as the main characteristics for being classified into the target class are very different. A threshold value can be set to compare against the centroid distance to determine whether the cluster distance corresponds to the benign case (i.e., relatively short). Because the defensive technique is empirical, the threshold distance value can be adapted depending on observations. For example, the threshold value can be determined by comparing the centroid distances obtained for the current model with the distances obtained for the previous model and/or average distances obtained for the previous x models. As another example, because clustering is done once per class (for a given test set), the centroids' distances obtained for each class can be compared, and possible outliers can be identified.

The silhouette score measures how well a sample fits into its own cluster A compared to other clusters. It is calculated for a sample by determining its average distance to all other clusters. The average distance of a sample to a cluster thereby denotes the mean distance to every element in that cluster. s(i) lies in a range from −1 to 1. A negative value indicates that the sample might have been assigned to the wrong cluster, a value around 0 says that the element is very close to another cluster, and a value close to 1 suggests that it fits well into the assigned cluster. That is, a silhouette score between 0 and 1 indicates how well the sample fits with the cluster it has been assigned to, where 1 suggests an optimal assignment while 0 indicates a borderline fit. The class-wise average silhouette score is used because, if a class is poisoned, its activations will clearly split up into two clusters: one will contain the normal samples of the class and the other should contain the backdoor images. It follows, that the silhouette scores should be high (e.g., close to 1). On the other hand, when the class is clean, there is no clear boundary between the normal images that is detected through the clustering.

Also for this defense the mean and standard deviation from the previous x rounds are calculated to determine a threshold for benign updates. As such, the 6th step is to access if the metric (chosen out of clusters' sizes, centroid's distances and silhouette score) lies in the allowed range. The allowed range can be set according to the mean and standard deviations obtained from previous observations. The value calculated according to the chosen metric should not deviate more than $z\sigma$ from the mean $\mu$ of the previous observations, where z is a fixed integer (e.g., z=1,2,3) and $\sigma$ is the standard deviation.

A difference between Chen's clustering and that of the present invention is that, in the present invention, the activation clustering is configured to defend against semantic backdoors and not against trojaned backdoors. Additionally, the present activation clustering includes the analysis of the distances between the centroids and is extend to federated learning (including applying activation clustering in a distributed manner which will be explained below).

Figure 6:
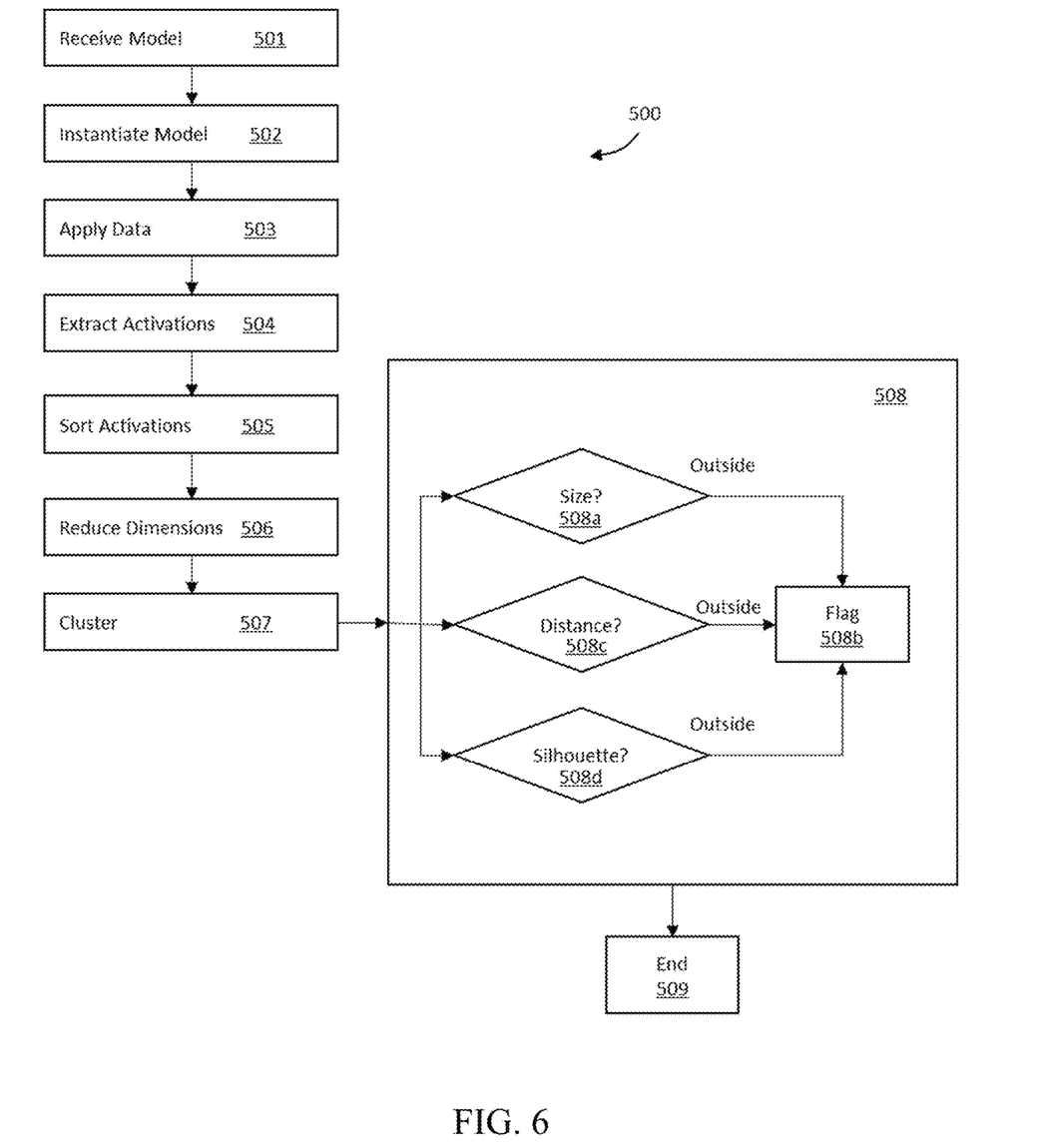
FIG. 6 illustrates a method of operating an activation clustering defensive layer.

FIG. 6 illustrates a method of performing an embodiment of the clustering analysis for the second defensive layer. The clustering analysis method 500 may be performed by a central server and/or by one or more clients. For example, when the feedback loop defensive layer (i.e., the third defensive layer) is implemented, a selection of clients may each perform the method 500 (e.g., in parallel on their own test data).

As shown in FIG. 6, a current model is received (501) and instantiated (502) (or was previously received and instantiated). Test data is then applied as an input to the current model to obtain classification predictions (503). Activations are then extracted from the model (e.g., after the last hidden layer) (504). The extracted activations are then sorted according to the predicted class (505). Dimension reduction is then applied on each group of sorted activations (506). The reduced activations are then clustered into groups (507).

The clustering analysis method 500 then applies one or more metrics (in series or parallel) to the clustered activations to determine whether the model is exhibiting suspicious behavior (e.g., to determine whether the model has been poisoned) (508). One metric may be the size of the clusters. Here, the method 500 determines whether any of the clusters are significantly smaller (e.g., smaller than a predefined threshold) (508a); and if, so flags the model as suspicious (508b). Another metric may be the centroid distances of the clusters. Here the method 500 determines whether one or more centroid differences are significantly lager (e.g., larger than a predefined threshold) (508c); and if so, flags the model as suspicious (508b). A third metric may be the class-wise average silhouette of the clusters. Here, the method 500 determines whether the class-wise average silhouette of the clusters is significantly large (e.g., larger than a predefined threshold) (508d); and if so, flags the model a suspicious (508b). Otherwise, the model is considered benign (at least by this defensive layer) (509).

Figure 7:
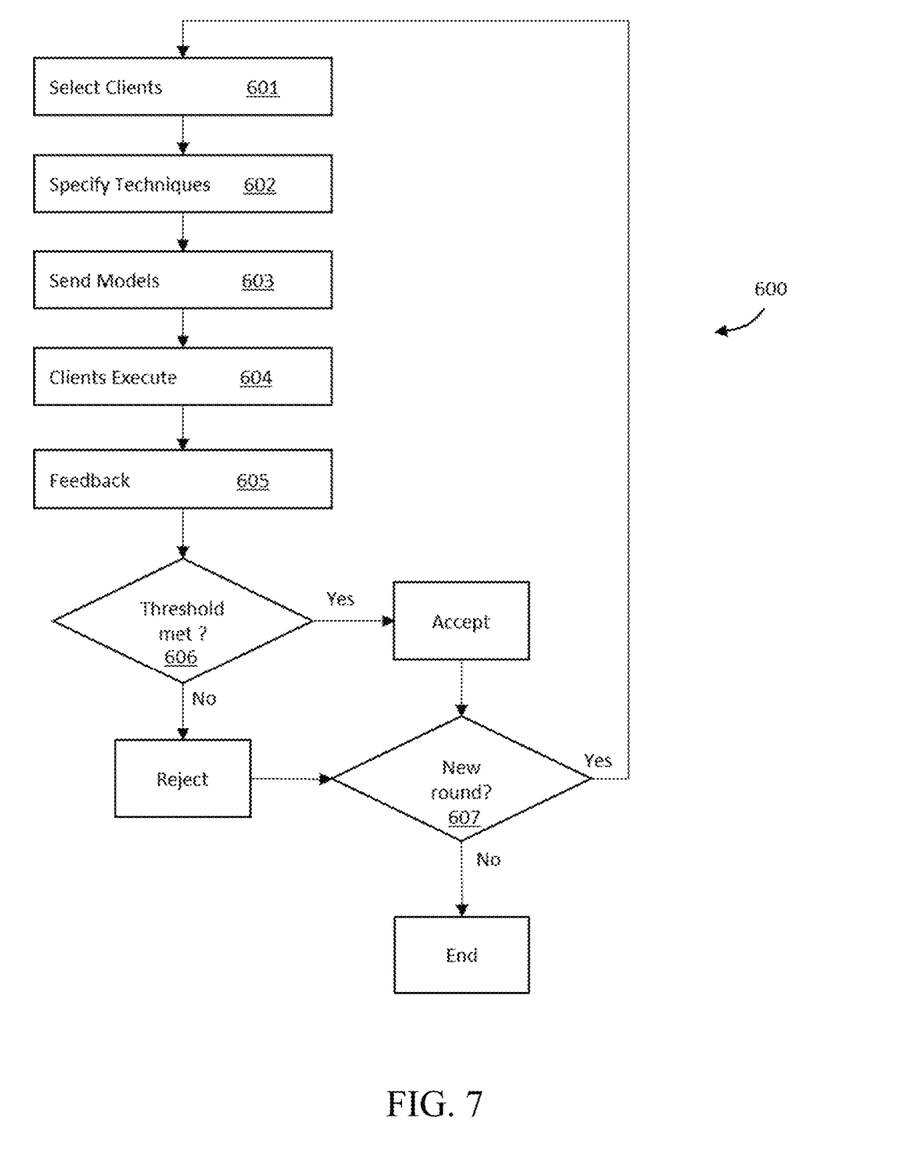
FIG. 7 illustrates a method of performing an embodiment of the feedback loop defensive layer.

FIG. 7 illustrates a method 600 of performing an embodiment of the feedback loop defensive layer, which is also referred to as the third defensive layer D3.

The third defensive layer leverages the availability of (honest) clients to support the server in detecting poisoning attempts. It is referred to as the feedback loop defensive layer because, in every round, the server asks (honest) clients for feedback on the current model. In this way, the approach of embodiments of the present invention further departs from previous proposals to secure federated learning because, beyond relying on clients for training the model, embodiments benefit from the diversity of clients' data for evaluating the quality of the model and detecting unexpected behavior.

More specifically, in every round of federated learning the server selects a set of clients that are responsible not only for training the new global model, but also for testing the model resulting from the updates proposed in the previous round (601). This approach enables avoiding additional communication overhead. To expand, an alternative approach could be to ask the clients to evaluate the updated global model within the same round. To this end, the server would have to send the updated model to the selected clients, therefore adding one round of communication. Embodiments of the present invention avoid this extra round by letting the clients evaluate the model obtained in the previous round.

To instantiate the feedback loop, a detection technique is specified for the evaluators to apply to the current model (602). One simple option is to test the accuracy of the model on the local training data. However, since plain accuracy testing has be shown to be ineffective against backdoor attacks (as the attacker can craft updates that preserve good accuracy on the main task), embodiments may use the more fine-grained detection methods introduced above. For example, the detection technique may specify that the clients inspect the class-specific misclassification distribution and/or perform activation clustering.

To be able to compare to the previous x models, the selected clients of one iteration will not only be supplied with the newest global model by the server but also with the previous x global models (603). This is because only a subset of clients participate in every round such that they might not have a previous model to use to evaluate a new update. To avoid this, the selected clients will receive the last x models in the beginning of a new round. The selected clients will then execute the specified detection technique(s) and/or the training of the current model (604). The server will then receive the results from the clients (605). The server will accept a global model and apply a new update on it when at most q clients in an iteration have accepted it, $1 \leq q \leq n$ (606). The server will then initiate a new round (until all rounds have been completed) (607).

Algorithm 1 shows an embodiment of a feedback loop at a client. In this sample, the client first applies activation clustering, and if the result does not appear suspicious, the misclassification distribution will be analyzed. According to the embodiment, only if both checks are passed will a new update be created and returned (AND-combination). Alternatively, the order of the defense layers can of course be switched or an OR-combination can be performed, which means that both analyses will be done in parallel and the update will be rejected if one of them indicates that it looks suspicious.

---

Algorithm 1 Feedback Loop at Client k

INPUT: $D_{test_k}$, $D_{train_k}$, $G^t$, n  ▷test data, train data, global model, number of classes
OUTPUT: $flag_{clus}$, $flag_{miscl}$, or $L_k^{t+1}$  ▷result clustering check, result misclassification check or local update
  a_collection, miscl_samples_target, miscl_samples_source = [[ ]

---

Algorithm 1 Feedback Loop at Client k for_∈ range(n)]
  foreach (x, true_label) ∈ $D_{test_k}$ do
    a = flattened activations of the last hidden layers of $G^t(x)$
    a_collection[$G^t(x)$].append(a)
    if $G^t(x)$ ≠ true_label then
      miscl_samples_target[$G^t(x)$]+= 1
      miscl_samples_source [true_label]+ =1
    end if
  end for
  miscl_rates_target = [ ]
  miscl_rates_source = [ ]
  foreach i∈ range(n) do
    a_collection[i] = reduce_dim(a_collection[i])    ▷dimension reduction
    cluster_result = cluster(a_collection[i])    ▷activation clustering
    $flag_{clus}$ = analysis_clustering(cluster_result)
    if $flag_{clus}$ == ok then $$\text{miscl\_rates\_target.append}\left(\frac{\text{miscl\_samples\_target}[i]}{\text{sum(miscl\_samples\_target)}}\right) \triangleright \text{miscl.}$$

Distribution $$\text{miscl\_rates\_source.append}\left(\frac{\text{miscl\_sampleas\_source}[i]}{\text{sum(miscl\_samples\_source)}}\right) \triangleright \text{miscl.}$$

Distribution
    else
      return $flag_{clus}$       ▷return activation clustering flag & class
    end if
  end for
  $flag_{miscl\_target}$ = analysis_miscl_distr(miscl_rates_target)
  $flag_{miscl\_source}$ = analysis_miscl_distr(miscl_rates_source)
  if $flag_{miscl\_target}$ == ok && $flag_{miscl\_source}$ then
    $L_k^{t+1}$ = update_model($G^t$, $D_{train_k}$)
    return $L_k^{t+1}$       ▷return local update
  else
    return $flag_{miscl}$       ▷return misclass. distribution flag & class
end if

---

Embodiments of the present invention may further integrate a secure aggregation protocol. The secure aggregation protocol may be added by letting only the clients that accepted the update engage in the secure aggregation protocol for a new update. All other clients will be considered as drop-outs, i.e., the same as clients that do not respond anymore.

The feedback loop can be seen as an additional layer of protection that a server can deploy in addition to the locally-implemented defenses (e.g., only employing the misclassification and clustering defenses locally at the server).

An advantage of having the global model evaluated by clients, similarly in spirit to the idea of decentralizing training, is to leverage the broader and more diverse test dataset that the clients can offer jointly. This feature also comes with the risk of giving some "voting power" on the global model to malicious/adversarially controlled clients, who may deliberately lie regarding whether they believe the model has been poisoned or not. Accordingly, embodiments of the present invention can weigh the feedback to ameliorate this phenomenon.

The defenses of the present invention (as described above), therefore, enhance the robustness of federated learning without compromising the confidentiality of the clients' data.

Figure 8:
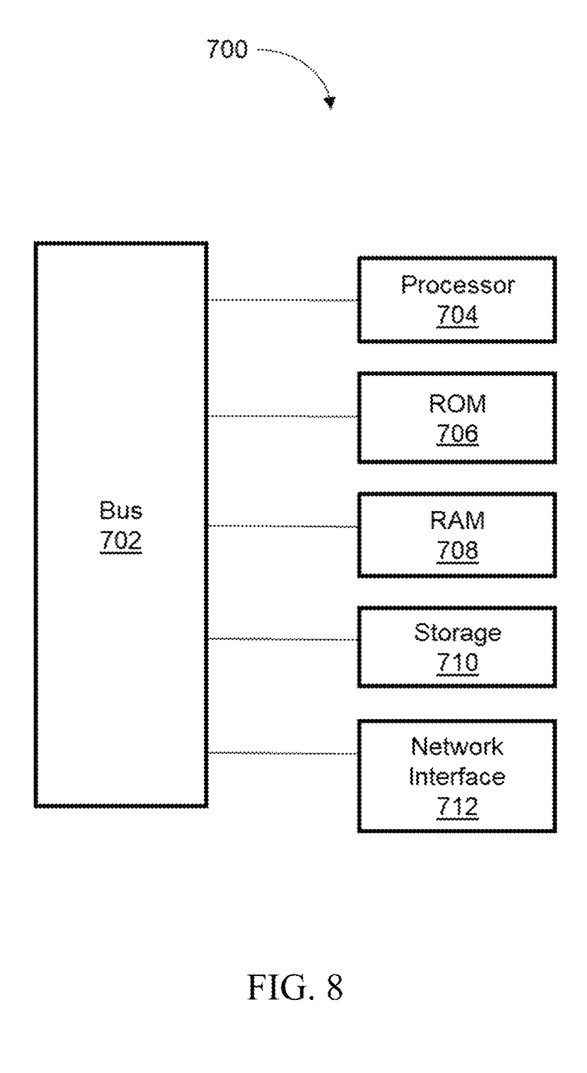
FIG. 8 illustrates a processing system according to an embodiment of the present invention.

FIG. 8 is a block diagram of a processing system 700 according to an embodiment. The processing system 700 can be used to implement the protocols, devices, mechanism, systems and methods described above. The processing system 700 includes a processor 704, such as a central processing unit (CPU) of a computing device or a distributed processor system. The processor 704 executes processor executable instructions (including scripts) comprising embodiments of the system for performing the functions and methods described above. In embodiments, the processor executable instructions are locally stored or remotely stored and accessed from a non-transitory computer readable medium, such as storage 710, which may be a hard drive, cloud storage, flash drive, etc. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting model poisoning attempts in a federated learning system comprising a server orchestrating with clients to train a machine learning model, the method comprising:
   receiving, by the server, a plurality of results of a plurality of poisoning detection analyses respectively from a plurality of the clients, each poisoning detection analysis, of the plurality of poisoning detection analyses, performed by each of the plurality of the clients, comprising performing at least one of: calculation and analysis of class-specific misclassification rates or activation clustering of a current state of the machine learning model.

2. The method of claim 1, the method further comprising:
   selecting, by the server, a subset of clients from the clients to each perform the respective poisoning detection analysis on the current state of the machine learning model;
   sending, by the server, to the subset of clients, at least the current state of the machine learning model; and
   receiving, by the server from the subset of clients, the plurality of results of the poisoning detection analyses.

3. The method of claim 2, the method further comprising:
   determining, by the server from the plurality of results of the poisoning detection analyses, a number of the subset of clients that have accepted the current state of the machine learning model; and
   determining, by the server, to update the current state of the model to a new state based upon the number of the subset of clients that have accepted the current state of the machine leaning model to meeting a threshold.

4. The method of claim 3, the method further comprising:
   selecting, by the server, a new subset of clients from the clients to each perform the respective poisoning detection analysis on the new state of the machine learning model;
   sending, by the server, to the new subset of clients, at least the new state of the machine learning model; and
   receiving, by the server from the new subset of clients, a new plurality of results of the poisoning detection analyses.

5. The method of claim 2, the method further comprising sending, by the server, a specification of the respective poisoning detection analysis to each client of the subset of clients, the specification comprising instructions on whether to perform one or both of the analysis of class-specific misclassification rates or the analysis of activation clustering.

6. The method of claim 2, wherein the server selects the subset of clients at random.

7. The method of claim 1, wherein performing the analysis of class-specific misclassification rates by one of the clients comprises:
   applying test data to the current state of the machine learning model to obtain predictions;
   comparing the predictions to expected labels to obtain a misclassification distribution;
   applying at least one metric to determine one or more aggregation of distances;
   flagging the current state of the model as poisoned based upon the one or more distances exceeding a threshold; and
   sending, to the server as a respective result of the poison detection analysis, an indication that the current state of the model is flagged as poisoned.

8. The method of claim 7, wherein the at least one metric comprises distances among class-specific error rates for the current state of the machine learning model as compared to a previous state of the machine learning model or pairwise differences in error rates among classes for the current state of the machine learning model.

9. The method of claim 7, wherein the aggregation performed corresponds to at least one of sum, absolute, Euclidian, or squared Euclidean norms.

10. The method of claim 1, wherein performing the analysis of activation clustering by one of the client's comprises:
    applying test data as an input to the current state of the machine learning model to determine activations of the machine learning model;

extracting the activations from the machine learning model;

sorting the activations according to predicted classes into groups;

performing a dimension reduction on each group of the sorted activations;

clustering the reduced activations into clusters; and applying at least one metric to the clusters to determine whether at least one threshold is exceeded;

flagging the current state of the model as poisoned based upon exceeding the at least one threshold; and sending, to the server as a respective result of the poison detection analysis, an indication that the current state of the model is flagged as poisoned.

11. The method of claim 10, wherein the at least one metric comprises at least one of a threshold size of the clusters, a threshold centroid distance of the clusters, or a threshold class-wise average silhouette of the clusters.

12. The method of claim 1, the method further comprising, applying, by the server, test data as an input to the current state of the machine learning model in order to determine predictions for use in the analysis of class-specific misclassification rates or to extract activations for use in the analysis of activation clustering.

13. The method of claim 1, wherein the server receives the plurality of results of the poisoning detection analyses from the plurality of clients, wherein at least one of the results of the respective poisoning detection analysis is based upon the analysis of the class-specific misclassification rates and the analysis of the activation clustering of the current state of the machine learning model.

14. The method of claim 1, wherein each of the plurality of poisoning detection analyses performed by each of the clients further comprises determining whether or not poisoning has occurred, and wherein each of the results provides an indication as to whether not poisoning is detected by the respective one of the clients.

15. A system comprising one or more processors coupled to a non-transitory storage medium or media containing instructions, which when executed by the one or more processors, alone or in combination, cause the system to perform a method comprising:

receiving a plurality of results of a plurality of poisoning detection analyses respectively from a plurality of clients, each poisoning detection analysis, of the plurality of poisoning detection analyses, performed by each of the plurality of the clients, comprising performing at least one of: a calculation and an analysis of class-specific misclassification rates or activation clustering of a current state of the machine learning model.

16. The system of claim 1, wherein the method further comprises:

selecting a subset of clients to each perform the respective poisoning detection analysis on the current state of the machine learning model;

sending to the subset of clients at least the current state of the machine learning model; and receiving, from the subset of clients, the plurality of results of the poisoning detection analyses.

17. A tangible, non-transitory computer-readable medium having instructions thereon which, upon being executed by one or more processors, alone or in combination, provide for execution of a method comprising:

receiving results of a plurality of poisoning detection analyses respective from a plurality of clients, each poisoning detection analysis, of the plurality of poisoning detection analyses, performed by each of the plurality of the clients, comprising at least one of: calculation and analysis of class-specific misclassification rates or of activation clustering of a current state of the machine learning model.

18. The computer-readable medium of claim 17, wherein the method further comprises:

selecting a subset of clients to each perform the respective poisoning detection analysis on the current state of the machine learning model;

sending to the subset of clients at least the current state of the machine learning model; and receiving, from the subset of clients, the plurality of results of the poisoning detection analyses.

* * * * *